July 24, 1962 B. T. LIPMAN 3,045,855
CANDLESTICK, DISH AND COMPOTE
Filed Feb. 21, 1962
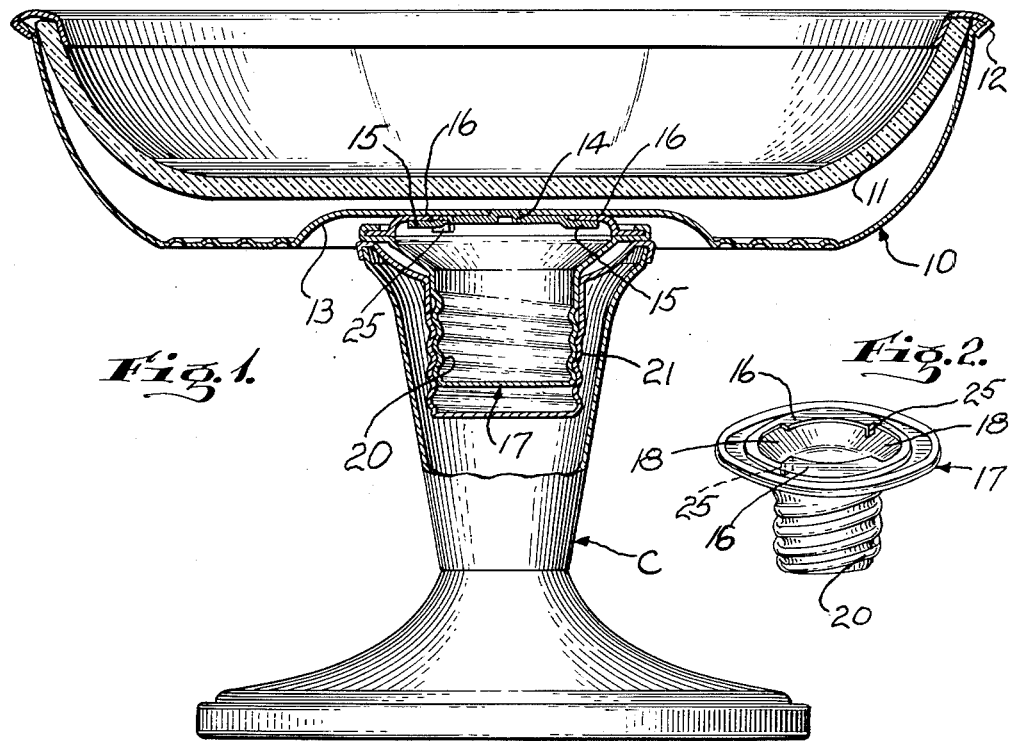
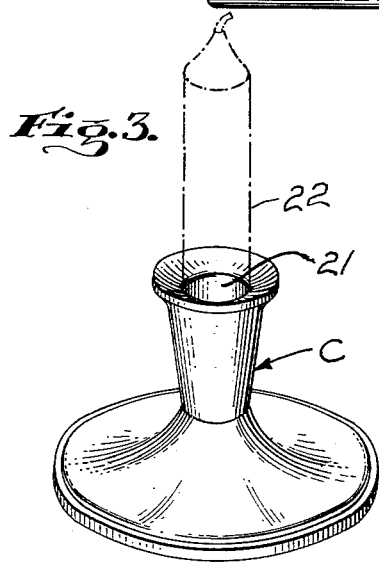
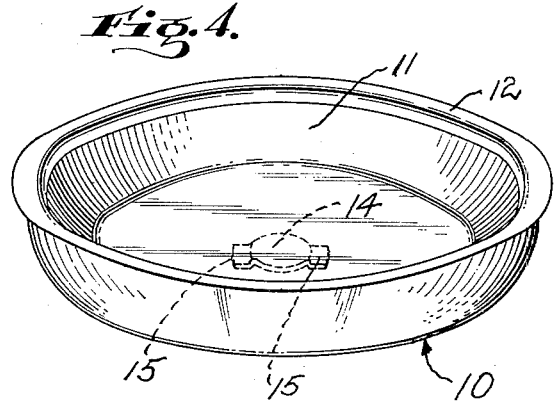
INVENTOR.
B. T. Lipman
BY
ATTORNEY

United States Patent Office 3,045,855
Patented July 24, 1962

3,045,855
CANDLESTICK, DISH AND COMPOTE
Bruin T. Lipman, 58 Cambridge St., Meriden, Conn.
Filed Feb. 21, 1962, Ser. No. 174,881
5 Claims. (Cl. 215—99.5)

This invention relates to a candlestick and candy dish, each so formed that it is usable alone, yet adapted to be assembled to one another to form a compote. Thus, the candy dish is usable as a candy dish, while the candlestick is usable as a normal candlestick. By the simple use of an adaptor element the candlestick and dish may be transformed into a very effective compote.

As a feature of my invention, the candlestick has the appearance of a normal candlestick equipped with a socket into which a candle may be inserted. However, this socket is threaded for a special type of adaptor which may therefore be threaded into the socket to form an integral part thereof.

The candy dish of my invention is formed with a fastener element in the form of a bayonet joint element, and as one detailed feature of my invention, the bayonet joint element is positioned in a concave portion formed on the bottom of the dish. In this way, the dish may readily be deposited on a table and the bayonet joint fastener element will not interfere with the normal functioning of the dish.

The adaptor to which I have earlier referred, is formed with a bayonet joint element adapted to coact with the bayonet joint element on the bottom of the dish so that the two may be interlocked, whereupon, with the adaptor threaded into the socket of the candlestick, the candlestick and the dish become a single element that takes the shape of a compote.

As a further particular feature of the invention, the two coacting bayonet joint elements are so formed that rotation of the dish in a particular direction will rotate the adaptor relatively to its candlestick to thread it out of the candlestick.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings,

FIG. 1 is an elevation and partial section of the candlestick, the adaptor, and the candy dish assembled to form a console;

FIG. 2 is an isometric view of the adaptor;

FIG. 3 is an isometric view of the candlestick, while

FIG. 4 is an isometric view of the candy dish.

Referring now more particularly to the drawings, the candy dish of my invention is designated by the reference numeral 10, and is formed with a glass lining 11 assembled thereto by a cap element 12. The bottom of the candy dish 10 is concave as well illustrated at 13 in FIG. 1, and soldered in the center of this concave portion 13 is a bayonet joint element 14, of that form having a pair of wings 15, as best seen in FIG. 4. The wings 15 are actually spaced somewhat from the bottom 13 as is best illustrated in FIG. 1 for coaction with cooperating bayonet joint fastener elements formed on the adaptor of my invention.

Referring now to FIG. 2, the adaptor is designated by reference numeral 17, and has on its upper surface a pair of flanges 16 forming a bayonet joint fastener element with which coact the two wings 15 of the bayonet joint element 14. Thus, the two wings 15 enter in the spaces 18 between the flanges 16 and ride under the flanges. In this way, the dish and the adaptor 17 are readily assembled to one another.

A threaded sleeve-like portion 20 is formed on the adaptor, and this threaded sleeve 20 is adapted to be threaded into a threaded socket 21 that is integral with the candlestick C. Thus, the candlestick, as is well shown in FIG. 3, takes the usual form. It has a socket 21 into which a candle 22, shown in phantom, may be inserted. The socket 21, as has been set forth and as best seen in FIG. 1, is threaded for coaction with the threaded sleeve 20 of the adaptor.

Those skilled in the art will now appreciate that, as I outlined at the beginning of this specification, candlestick C is usable as a standard candlestick. The dish 10 is usable as a standard candy dish. By threading the adaptor 17 into the socket 21, the adaptor 17 and the candlestick C become a unitary element. The candy dish 10 may then be assembled to this unitary element through the entry of the wings 15 of the bayonet joint element into locking coaction with the flanges 16 of the adaptor 17.

In the event the adaptor is rather tightly threaded into the threaded socket 21, it may be released readily through coaction of the wings 15 of the dish 10 with lugs 25 formed on the flanges 16. On the one hand, the lugs 25 limit the rotation of the wings 15 in a fastening direction relatively to the adaptor 17. On the other hand, the lugs 25 permit contact between the wings 15 and the adaptor to unscrew the adaptor relatively to the threaded socket 21.

I now claim:

1. In a combination of the class described,
   a candlestick holder having a candlestick socket formed with screw threads,
   an adaptor threaded into said socket,
   a fastener element formed on said adaptor,
   a dish,
   and a fastener element on the bottom of said dish adapted to interlock with said fastener element on said adaptor to form a console of said candlestick and dish while not obstructing the separate use of said dish.

2. In a combination of the class described,
   a candlestick holder having a candlestick socket formed with screw threads,
   an adaptor adapted to be threaded into said socket,
   a bayonet joint fastener element formed on said adaptor,
   a dish having a concave bottom,
   and a coacting bayonet joint fastener element on the bottom of said dish adapted to interlock with said fastener element on said adaptor to form a console of said candlestick and dish while not obstructing the separate use of said dish.

3. In a combination of the class described,
   a candlestick holder having a candlestick socket formed with screw threads,
   an adaptor threaded into said socket,
   a bayonet joint fastener element formed on said adaptor,
   a dish,
   and a coacting bayonet joint fastener element on the bottom of said dish adapted to interlock with said fastener element on said adaptor to form a console of said candlestick and dish while not obstructing the separate use of said dish.

4. In a combination of the class described,
a candlestick holder having a candlestick socket formed with screw threads,
an adaptor threaded into said socket,
a fastener element formed on said adaptor,
a dish having a concave bottom,
and a fastener element on the concave bottom of said dish adapted to interlock with said fastener element on said adaptor to form a console of said candlestick and dish while not obstructing the separate use of said dish.

5. In a combination of the class described,
a candlestick holder having a candlestick socket formed with screw threads,
an adaptor adapted to be threaded into said socket,
a bayonet joint fastener element formed on said adaptor,
a dish,
a coacting bayonet joint fastener element on the bottom of said dish adapted to interlock with said fastener element on said adaptor to form a console of said candlestick and dish,
and portions of said bayonet joint elements coacting to screw said adaptor out of said socket when said dish is rotated in one direction relatively to said adaptor.

No references cited.